US011720160B2

(12) United States Patent
Iyer et al.

(10) Patent No.: US 11,720,160 B2
(45) Date of Patent: Aug. 8, 2023

(54) PREVENTING FALSE WAKE EVENTS FROM A LOW-POWER STATE

(71) Applicant: Dell Products, L.P., Round Rock, TX (US)

(72) Inventors: Vivek Viswanathan Iyer, Austin, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 180 days.

(21) Appl. No.: 16/382,826

(22) Filed: Apr. 12, 2019

(65) Prior Publication Data

US 2020/0326767 A1 Oct. 15, 2020

(51) Int. Cl.
*G06F 1/3231* (2019.01)
*G06F 1/16* (2006.01)

(52) U.S. Cl.
CPC .......... *G06F 1/3231* (2013.01); *G06F 1/1677* (2013.01); *G06F 1/1681* (2013.01); *G06F 1/1669* (2013.01)

(58) Field of Classification Search
CPC .... G06F 1/3296; G06F 1/3212; G06F 1/3234; G06F 1/3206; G06F 1/263; Y02D 30/50; H02J 7/0019
USPC ........................................................ 713/340
See application file for complete search history.

(56) References Cited

U.S. PATENT DOCUMENTS

| | | | | |
|---|---|---|---|---|
| 9,710,048 B2* | 7/2017 | Zhao | ..................... | G06F 1/3265 |
| 10,572,270 B1* | 2/2020 | Sampath | ............... | G06F 1/1684 |
| 2010/0153765 A1* | 6/2010 | Stemen | .................. | G06F 1/3203 |
| | | | | 713/340 |
| 2011/0163723 A1* | 7/2011 | Tan | ........................ | H02J 7/0029 |
| | | | | 320/134 |
| 2016/0116960 A1* | 4/2016 | Kwak | .................... | G06F 1/3231 |
| | | | | 713/323 |
| 2016/0147266 A1* | 5/2016 | Chng | ..................... | G06F 1/1677 |
| | | | | 713/100 |
| 2016/0274722 A1* | 9/2016 | Putzolu | ............... | G06F 3/03547 |
| 2017/0102758 A1* | 4/2017 | Siaw | .................... | G06F 3/04883 |
| 2018/0004275 A1* | 1/2018 | Tubbs | .................... | H04N 5/232 |
| 2019/0102001 A1* | 4/2019 | O'Connor | ............... | G06F 3/044 |
| 2020/0081560 A1* | 3/2020 | Geller | .................. | G06F 1/3231 |

* cited by examiner

*Primary Examiner* — Paul Yen
(74) *Attorney, Agent, or Firm* — Fogarty LLP

(57) ABSTRACT

An IHS (Information Handling System) may transition to a low-power state when the IHS is not in use. Upon detecting a wake event, such as a button being pressed, the IHS exits the low-powers state and resumes a full-power operating state. When a wake event is inadvertently triggered, the IHS may reverted to full-power operations without the user's knowledge. In order to detect false wake events, embodiments determine contextual information about the current status of the IHS, such as power status, operational status and user status, at the time of the wake event detection. If a valid wake event is detected, the operating system is notified of the wake event. If the wake event is determined to be inadvertent based on the context of the IHS, such as the IHS being in transport and/or the user not being present in proximity to the IHS, the wake event may be disregarded.

17 Claims, 6 Drawing Sheets

… (1)

PREVENTING FALSE WAKE EVENTS FROM A LOW-POWER STATE

FIELD

This disclosure relates generally to Information Handling Systems (IHSs), and more specifically, to managing operational states of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may be configured to operate in a low-power state when the IHS is not in use. An IHS may transition to a low-power state based on a detected period of inactivity, lack of battery power, and/or in response to an input from a user of the IHS. While operating in a low-power state, the IHS may conserve power by turning off power to various internal components of the IHS. When transitioning to a low-power state, an IHS may store state information that can be used to restore the operating state of the user upon exiting the low-power state and resuming full-power operations. In some instances, the IHS may be configured to exit a low-power state upon detecting specific user activity, such as detecting a button of the IHS being pressed.

SUMMARY

In various embodiments, a method determines the validity of a wake event detected in an Information Handling System (IHS) operating in a low-power state. The method includes: detecting the wake event, determining a power status of the IHS at the time of the wake event detection; determining an operational status of the IHS at the time of the wake event detection; determine a user status of the IHS at the time of the wake event detection; determining a validity of the wake event based on the power status, the operational status and the user status; suppressing an invalid wake event; and notifying an operating system of the IHS of a valid wake event.

In additional method embodiments, the power status indicates whether the IHS is operating from battery power. In additional embodiments, the method further includes determining movement of the IHS at the time of the wake event detection, wherein the validity of the wake event is determined further based on the movement. In additional embodiments, the method further includes determining an orientation of the IHS at the time of the wake event detection, wherein the validity of the wake event is determined further based on the orientation.

In additional method embodiments, the wake event is determined to be invalid if the movement and the power status indicate the IHS is in transport. In additional method embodiments, the IHS is a laptop and the operational status indicates whether the laptop is in a closed configuration. In additional method embodiments, the user status indicates whether a user is detected in proximity to the IHS at the time of the wake event detection. In additional embodiments, the method further includes determining a physical configuration mode of the IHS at the time of the wake event detection, wherein the IHS is a convertible laptop, and wherein the physical configuration mode indicates a posture of the convertible laptop based in part on a hinge angle of the convertible laptop.

In various additional embodiments, an Information Handling System (IHS) is configured to determine the validity of a wake event while operating in a low-power state. The IHS includes: a plurality of hardware components configured to operate at reduced power while the IHS is in the low-power state, wherein the plurality of hardware components comprises a main processor system of the IHS; a sensor hub comprising a logic unit configured via firmware instructions to determine a user status of the IHS; and an embedded controller comprising a logic unit configured via firmware instructions to: detect the wake event; receive the user status of the IHS from the sensor hub; determine a power status of the IHS; determine an operational status of the IHS; determine a validity of the wake event based on the power status, the operational status and the user status; suppress an invalid wake event; and notify an operating system of the IHS of a valid wake event.

In additional IHS embodiments, the power status indicates whether the IHS is operating from battery power. In additional IHS embodiments, the IHS is a laptop and the operational status indicates whether the laptop is in a closed configuration. In additional IHS embodiments, the wake event is determined to be invalid if the operational status and the power status indicate the IHS is in transport. In additional IHS embodiments, the user status indicates whether a user is detected in proximity to the IHS at the time of the wake event detection.

In various additional embodiments, an Information Handling System (IHS) is configured to determine the validity of a wake event while operating in a low-power state. The IHS includes: a plurality of hardware components configured to operate at reduced power while the IHS is in the low-power state, wherein the plurality of hardware components comprises a main processor system of the IHS. An embedded controller comprising a logic unit is configured via firmware instructions to: detect the wake event; determine a power status of the IHS; determine an operational status of the IHS; notify a sensor hub of the wake event, the power status and the operational status; suppress an invalid wake event; and notify an operating system of the IHS of a valid wake event. The sensor hub comprising a logic unit is configured via firmware instructions to: determine a user status of the IHS; determine a validity of the wake event based on the power status, the operational status and the user status; and notify the embedded controller of the determined validity of the wake event.

In additional IHS embodiments, the power status indicates whether the IHS is operating from battery power. In additional IHS embodiments, the IHS is a laptop and the operational status indicates whether the laptop is in a closed configuration. In additional IHS embodiments, the sensor hub is further configured to determine movement of the IHS at the time of the wake event detection, wherein the validity of the wake event is determined further based on the movement. In additional IHS embodiments, the wake event is determined to be invalid if the operational status, the power status and the movement indicate the IHS is in transport. In additional IHS embodiments, the sensor hub is further configured to determine an orientation of the IHS at the time of the wake event detection, wherein the validity of the wake event is determined further based on the orientation. In additional IHS embodiments, the user status indicates whether a user is detected in proximity to the IHS at the time of the wake event detection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
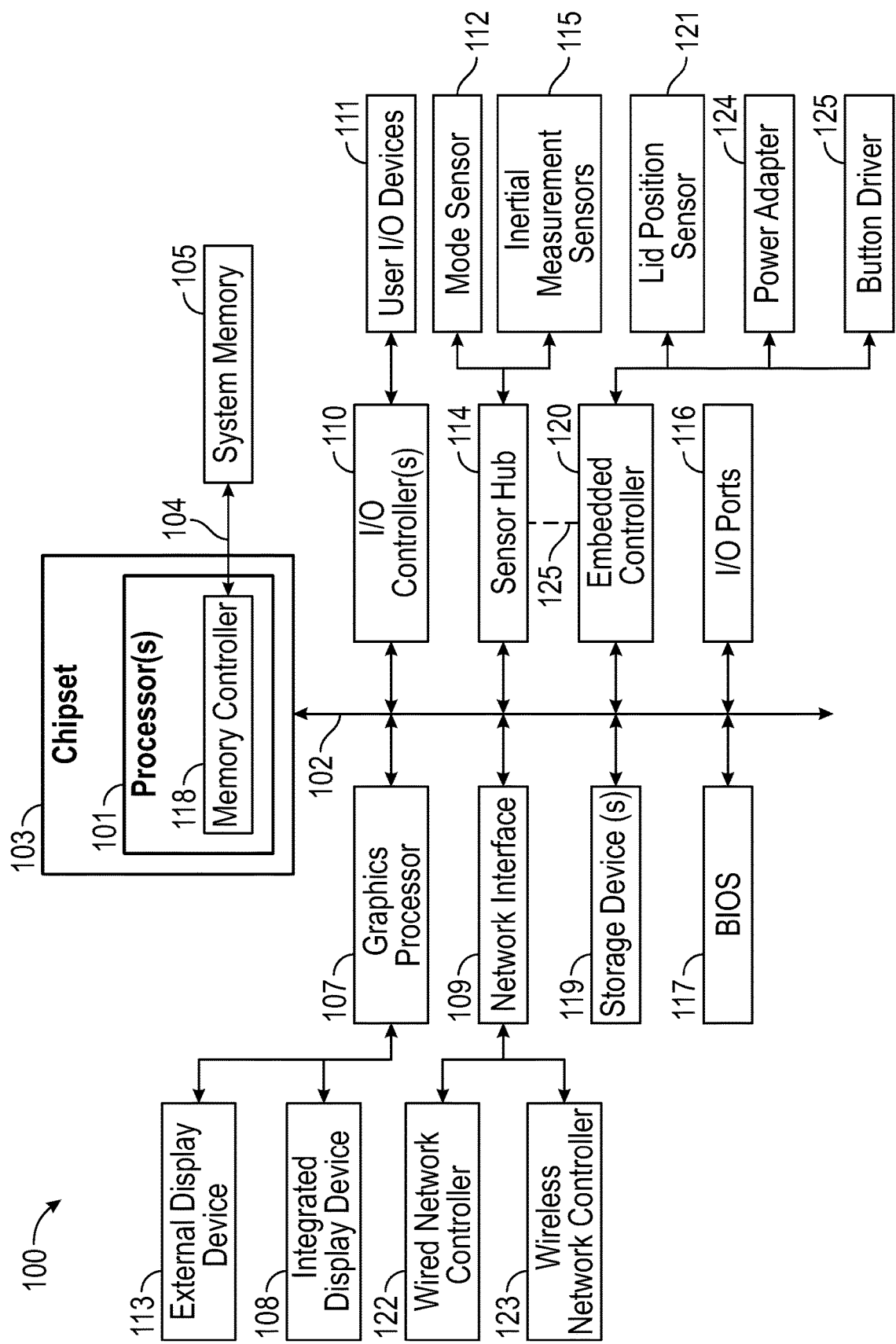
FIG. 1 is a block diagram depicting certain components of an IHS configured according to various embodiments for preventing false wake events of the IHS from a low-power state.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, an IHS may transition to a low-power state during times when the IHS is not in use. While in a low-power state, the IHS may conserve energy and reduce cooling requirements by turning off power to various internal components of the IHS as well as to any external devices coupled to the IHS. Upon detecting a wake event, such as a button being pressed, the IHS exits the low-powers state and resumes a full-power operating state in expectation that a user will being resuming operation of the IHS. However, in scenarios where a wake event is inadvertently triggered, the IHS may exit a low-power state even though the user is not expecting to resume use of the IHS and may be unaware the IHS has reverted to full-power operations. In mobile IHSs that operate using battery power, such inadvertent wake events may result in the IHS resuming full-power operations and draining all or some of the available battery power without the user's knowledge. In scenarios where the IHS is plugged into a power source, whether the IHS is mobile or not, such inadvertent wake events result in unnecessary power consumption, additional wear on the cooling system and additional noise resulting from the operation of the cooling system.

FIG. 1 is a block diagram illustrating certain components of an IHS 100 configured according to certain embodiments to prevent false wake events of the IHS 100 from a low-power state. In various embodiments, IHS 100 may include an embedded controller 120 and a sensor hub 114 that may each executes program instructions that cause these two components to perform certain of the operations disclosed herein. As described, IHS 100 may transition to a low-power state upon detecting a period of inactivity, a lack of available batter power, and/or in response to a command from a user. An IHS 100 may be configured in various embodiments to wake from a low-power state and resume full-power operations in response to detecting various conditions or inputs.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. In certain embodiments, power to processor 101 and/or system memory 105 may be turned off, or configured to operate at a minimal power level, in response to IHS 100 entering a low-power operating state.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as W-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. In certain embodiments, power to network controllers 122 and/or 123 may be turned off, or configured to operate at minimal power levels, in response to IHS 100 entering a low-power state.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings. In some embodiments, detected display activity, such as activity detected on a touchscreen, may be configured as events that trigger IHS 100 to wake from a low-power state. In some embodiments, power to graphics processor 107, integrated display device 108 and/or external display 133 may be turned off, or configured to operate at minimal power levels, in response to IHS 100 entering a low-power state.

Other components of IHS 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100. I/O ports 116 may also support connections through more permanent couplings. For instance, via expansion slots provided via the motherboard or via an expansion card of IHS 100, such as an expansion card providing PCIe slots. In certain embodiments, each of the supported I/O ports 116 and connected devices or systems may be turned off, or configured to operate at minimal power levels, in response to IHS 100 entering a low-power state.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109. In certain embodiments, each of the supported storage devices 119 may be turned off, or configured to operate at a minimal power level, in response to IHS 100 entering a low-power state.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, the operation of one or more of the user I/O devices 110 coupled to IHS 100 may be configured to generate wake event signals that that trigger IHS 100 to wake from a low-power state. As described in additional detail below, such wake event signals may be evaluated in order to determine whether the wake event is legitimate or may be disregarded. As described in additional detail below, false wake events may be identified based on the current context of the configuration and operation of IHS 100.

As illustrated, certain IHS 100 embodiments may utilize a sensor hub 114 capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport). In certain embodiments, sensor hub 114 may also include capabilities for determining a location and movement of IHS 100 based on triangulation of network signal and based on network information provided by the operating system or a network interface 109. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 provide an indication of a user's presence near IHS 100. As described in additional detail below, such contextual information regarding the operating state of IHS 100 may be utilized to identify false wake event signals received when IHS 100 is in a low-power state.

In embodiments where IHS 100 may support multiple configurations, such as the convertible laptop described below with regard to FIGS. 2B-D, sensor hub 114 may include a mode sensor 112 capability that provides a determination of the current mode in which the IHS 100 is physically configured. In certain embodiments, such determinations may be made using the movement and orientation determinations made by the sensor hub 114 using the inertial movement sensors 115.

In laptop and convertible laptop embodiments, sensor hub 114 may utilize a hinge angle sensor to determine the relative angle between the two panels of the laptop. Based in this angle of rotation from a closed position, the sensor hub 114 may determine the mode in which the IHS 100 is configured. For instance, a first range of angles of rotation from a closed position may indicate a laptop configuration, a second range of angles may indicate a landscape configuration and a third range of angles may indicate a tablet configuration. The sensor hub 114 may additionally utilize orientation and movement information to determine the mode in which the IHS 100 is physically configured. For instance, if the sensor hub 114 determines the IHS 100 is configured with a hinge angle of a laptop configuration, but the IHS 100 is oriented on its side, the IHS may be determined to be in a book mode. If the IHS 100 is determined to be tiled towards a user's face and is experiencing slight movement, the sensor hub 113 may determine with certainty that the IHS 100 is being used in a book mode configuration. In this manner, the sensor hub 114 may determine that when the IHS 100 is opened such that it lies on a flat surface it is being used in a landscape mode. The sensor hub 114 may similarly determine IHS 100 is in a tent configuration, such as illustrated in FIG. 2C, based on the hinge angle and the orientation where the hinge is pointed upwards.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the mode sensor 112, orientation sensors 115 and sensors used for determining a user's presence near the IHS 100. Sensor hub 114 may collect and processes data from such sensors using data fusion techniques in order to determine contextual information regarding the operational state of IHS 100 at the time a wake event is detected.

As illustrated, IHS 100 embodiments may utilize an embedded controller 120 that may be a motherboard component of IHS 100 and may include one or more logic units. Firmware instructions utilized by embedded controller 120 may be used to operate a secure execution environment that may include operations for providing various core functions of IHS 100, such as power management, management of operating modes in which IHS 100 may be physically configured (e.g., determining a mode of a convertible laptop IHS based on the current hinge angle of the IHS) and support for certain integrated I/O functions.

In some embodiments, embedded controller 120 may be further configured to detect wake event signals from certain I/O devices. For instance, in embodiments where IHS 100 includes buttons, such as power buttons and the buttons that comprise an integrated keyboard of a laptop, embedded controller 120 may be configured to detect any of such buttons being depressed. When in a low-power state, embedded controller 120 may be notified upon a button driver 125 detecting a pressed button. Certain buttons may be configured such that button driver 125 generates a wake signal to embedded controller 120 when IHS 100 is in a low-power state. As described in additional detail with regard to below embodiments, embedded controller 120 may be configured to respond to such wake event signals by determining the current operating context of the IHS 100 in order to determine whether the wake signal is false and can be dismissed or whether the wake signal is legitimate should be propagated as a wake event to the operating system of IHS 100.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations for detecting any changes to the physical configuration of IHS 100 and managing the modes corresponding to different physical configurations of IHS 100. For instance, in embodiments where IHS 100 is a laptop computer or a convertible laptop computer, embedded controller 120 may receive inputs from a lid position sensor 121 that may detect whether the two sides of the laptop have been latched together to a closed position. In response to lid position sensor 121 detecting latching of the lid of IHS 100, embedded controller 120 may initiate operations for shutting down IHS 100 or placing IHS 100 in a low-power state.

The operations of the secure execution environment of embedded controller 120 may include operations describe herein for use in detecting false wake event signals to IHS 100. For instance, firmware of embedded controller 120 may respond to a wake signal, such as from button driver 125, by determining the current operating context of the IHS, such as whether the IHS 100 is currently in transport or whether the current lid position of the IHS indicates the IHS 100 is not in a physical configuration in which IHS 100 can be used. In certain embodiments, embedded controller 120 and sensor hub 114 may operate from a power plane that allows these components to operate while IHS 100 is in a low-power state. In some embodiments, embedded controller 120 and sensor hub 114 may communicate during low-power states via an out-of-band signaling pathway 125 that allows the processing of contextual inputs and validity determinations of detected wake events to be shared in various combinations between these two components. As described with regard to the below embodiments, embedded controller 120 may rely on sensor hub 114 in order to process the contextual inputs collected by the embedded controller 120 and the sensor hub 114. Based on such processing of the inputs describing the operating context of IHS 100, sensor hub 114 may determine the validity of detected wake signals.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
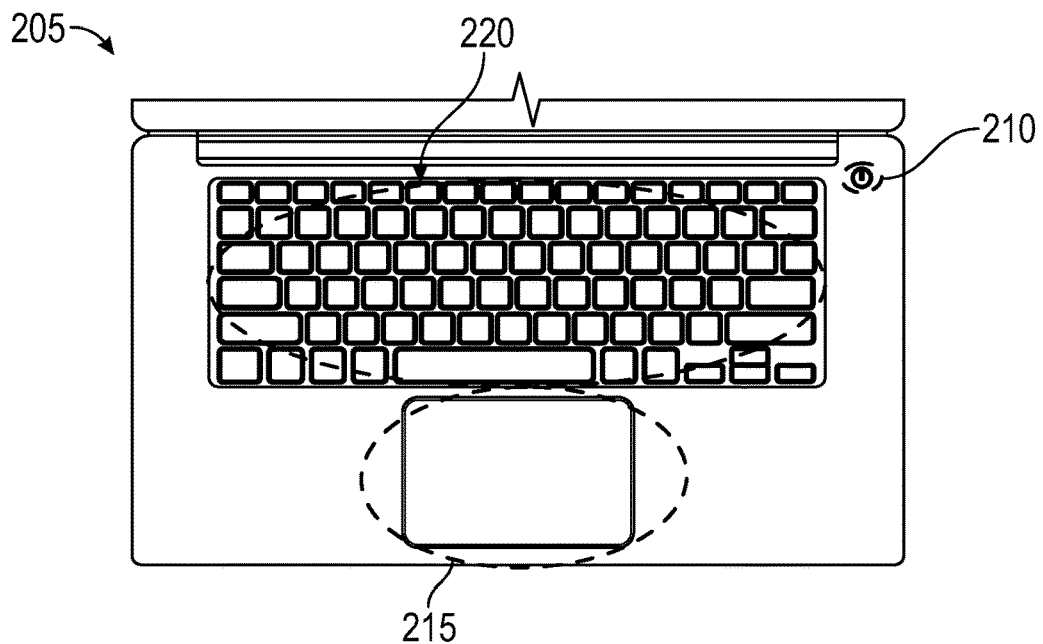
FIG. 2A is an illustration of an IHS that may be configured according to embodiments for preventing false wake events of the IHS from a low-power state.

FIG. 2A is an illustration of an IHS 205 that may be configured according to embodiments for preventing false wake events of the IHS from a low-power state. As described, an IHS may be placed in a low-power state in order to conserve energy and reduce cooling requirements. In certain instances, IHS 205 may be placed in a low-power state in response to a detected duration of inactivity. In other instances, IHS 205 may be placed in a low-power state in response to a command from a user of the IHS. For instance, a user of IHS 205 may select an option provided by the operating system to hibernate or sleep the IHS. This practice of manually setting IHS 205 in a low-power state may be particularly prevalent for mobile IHSs, such as a laptop, that may be transported by a user. In scenarios where a mobile IHS such as a laptop is being transported, users commonly place the mobile IHS in a low-power state for transfer.

As described, various internal components of IHS 205 may be powered down while the IHS is operating in a low-power state. Thus, while in a low-power state, the available battery power of IHS 205 may be conserved. As described, an IHS may be configured to exit a low-power state upon detecting various wake events. In certain instances, when IHS 205 is in a low-power state, it may be woken by the user pressing the power button 210. In some instances, IHS 205 may be woken from a low-power state by the detection of additional user inputs, such as a key of integrated keyboard 220 being pressed and/or contact with a trackpad 215. As described with regard to FIG. 1, IHS 205 may include various sensors that may be used to detect the presence of a user in proximity to the IHS 205. In such instances, IHS 205 may be configured to wake from a low-power state upon detecting a user in proximity to the IHS 205.

In scenarios where IHS 205 is woken from a low-power state while operating on battery power (i.e., the IHS is not plugged into a power source), the IHS 205 begins depleting the available battery power. Resuming full-power operations in response to a wake event allows use of IHS 205. However, an inadvertent wake event may result in IHS 205 exiting a low-power state and depleting battery power without user's knowledge. While being transported, such as within a shoulder bag, purse or backpack, a wake event may be inadvertently triggered. For instance, even though IHS 205 may be in a closed position while being transported, objects may nonetheless come in contact with a button 210, keypad 220 and/or trackpad 215 of the IHS. Such contact may trigger a wake event that causes the IHS 205 to exit a low-power state. In scenarios where an inadvertent wake event is triggered while IHS 205 is being transported, the battery power of IHS 205 may be depleted without the user's awareness. Additionally, since the inadvertently woken IHS 205 is in a full-power state and generating heat, IHS 205 may be damaged due to inability to properly ventilate heat while being transported within a bag or other carrying case.

Figure 2B:
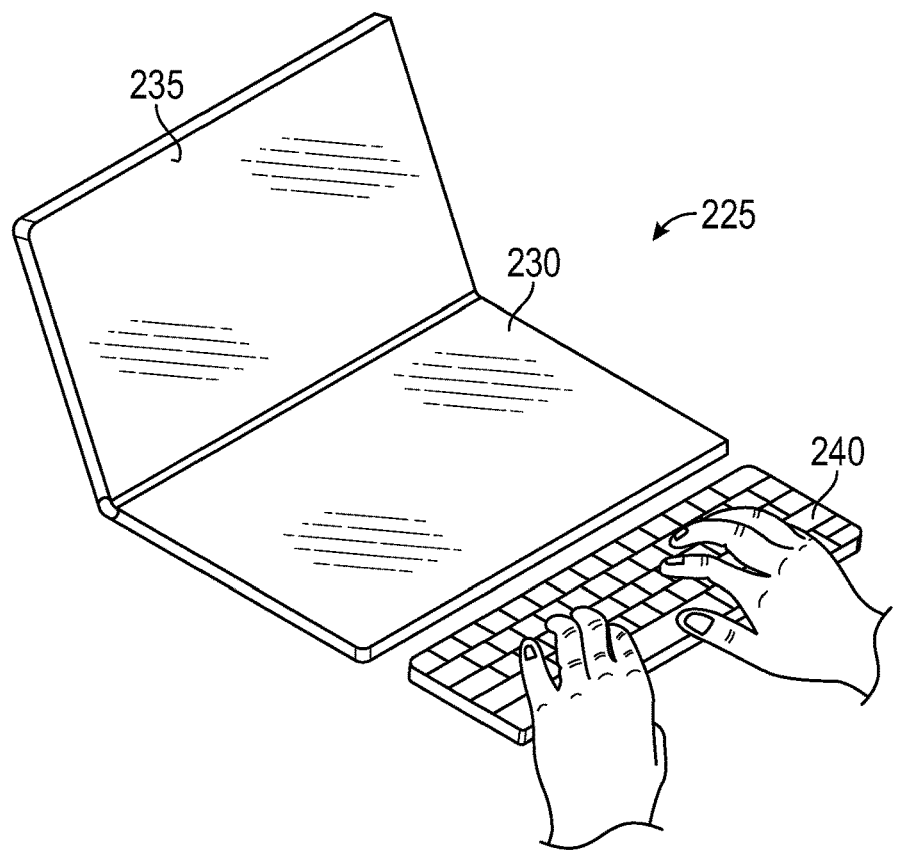
FIG. 2B is an illustration of an additional IHS that may be configured according to embodiments for preventing false wake events of the IHS from a low-power state.

FIG. 2B is an illustration of an additional IHS that may be configured according to embodiments for preventing false wake events of the IHS from a low-power state. The IHS of FIG. 2B is a convertible laptop 225 that supports the panels being rotated about a hinge in order to support a variety of operating modes that may be referred to as postures. As with the laptop of FIG. 2A, the convertible laptop 225 illustrated in FIG. 2B includes two panels 230 and 235. Whereas the illustrate base panel of the laptop of FIG. 2A includes an integrated keyboard, in some embodiments, both panels 230, 235 of the convertible laptop 225 may include integrated displays. In additional, convertible laptop 225 may utilize an external keyboard 240 that may be docked within the laptop 225 or may be used on a tabletop or desk surface, such as illustrated in FIG. 2B.

Figure 2C:
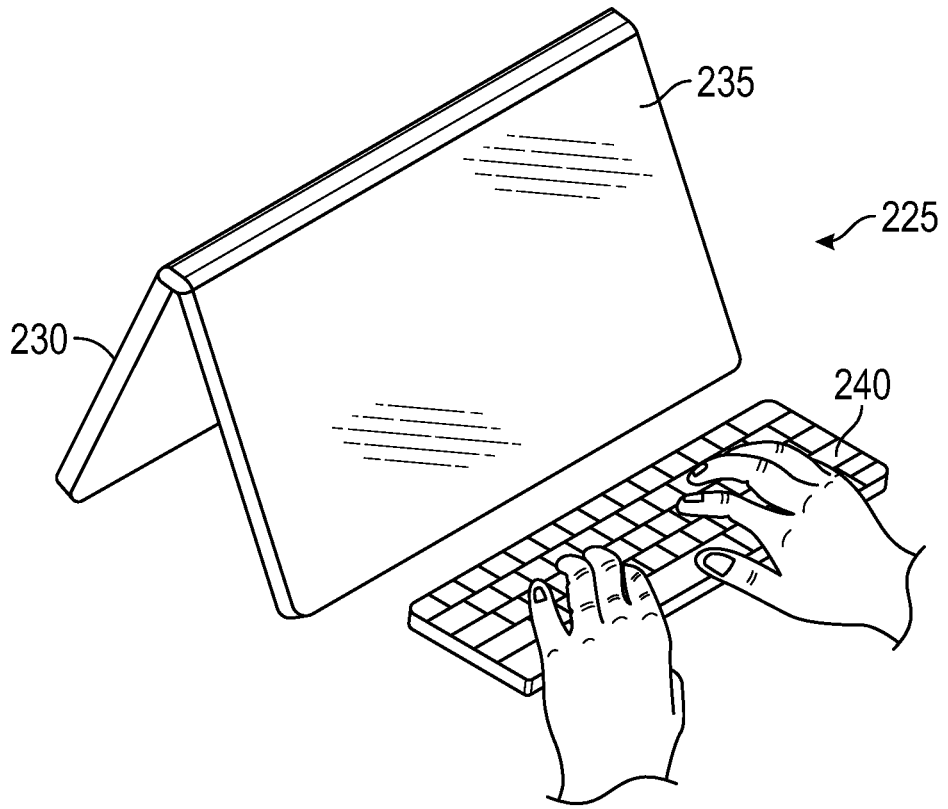
FIG. 2C is an illustration of one possible physical configuration of the IHS of FIG. 2B.

FIG. 2C is an illustration of an additional operating posture of the convertible laptop 225 of FIG. 2B. In FIG. 2C, the convertible laptop 225 is propped in a "tent" configuration in which one panel 235 is being used as a display and the other panel 230 is not active. In the tent configuration, the keyboard 240 is used on a tabletop or desk surface in view of the display panel 235. FIG. 2D is an illustration of the convertible laptop 225 where the laptop is configured for transport. As illustrated, the panels 230, 235 are rotated about hinge 250 of the convertible laptop 225 until they are in a closed position. In this closed position, the panels 230, 235 create a cavity in which the keyboard 240 may be stored.

Figure 2D:
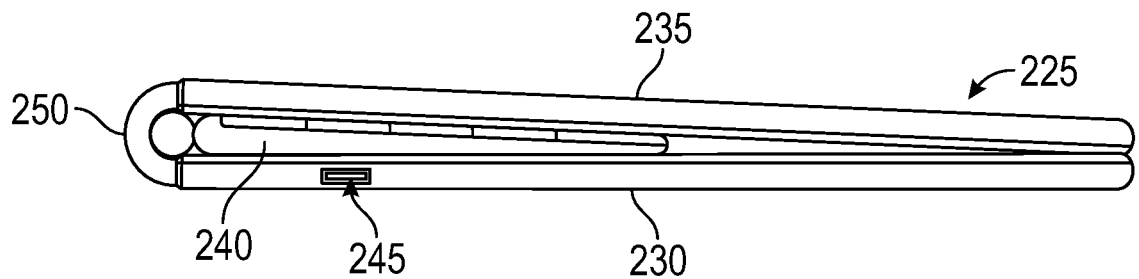
FIG. 2D is an illustration of another possible physical configuration of the IHS of FIGS. 2A and 2B.

As with the laptop of FIG. 2A, the convertible laptop 225 of FIGS. 2B-D may operate in a low-power state in which one or more components, such as the display screens 230, 235, may be powered down. In certain embodiments, the convertible laptop 225 may be configured to exit a low-power state upon detecting certain inputs, such as a user pressing a button, such as button 245, a user pressing a key of keyboard 240, or a touch input detected by one of the integrated display screens 230, 235. However, as described, such inputs may be inadvertent and may result in the convertible laptop 225 resuming full-power operations without the user's knowledge. Accordingly, embodiments provide the ability to distinguish legitimate wake events from false wake events based on the operating context of the convertible laptop 225. For instance, a wake event received while the convertible laptop 225 is in a transport configuration, such as in FIG. 2D, is more likely to be an inadvertent wake event in comparison to a wake event received while the convertible laptop 225 is configured for use, such as in FIGS. 2B and 2C. As described, additional contextual factors, such as whether the user is detected in proximity to the convertible laptop 225 may be additionally considered when evaluating the legitimacy of a detected wake event.

Figure 3:
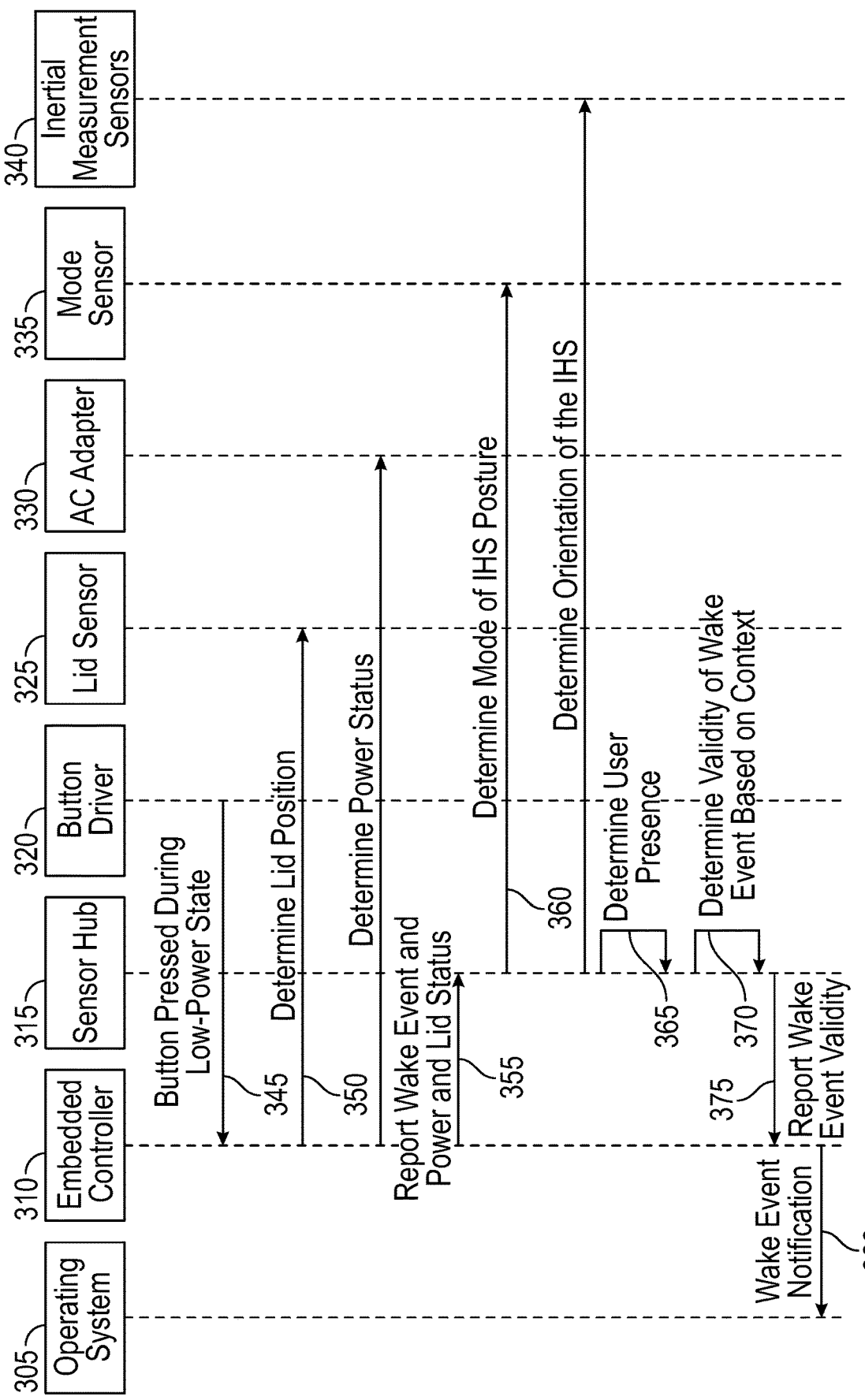
FIG. 3 is a swim lane diagram illustrating certain responsibilities of components of an IHS configured according to certain embodiments for preventing false wake events of the IHS from a low-power state.

FIG. 3 is a swim lane diagram illustrating certain responsibilities of components of an IHS configured according to certain embodiments for preventing false wake events of the IHS from a low-power state. As described, an IHS may be configured in a low-power state in which components of the IHS are shut down or reduced to minimal power levels. While in a low-power state, the operating system 305 of the IHS may be shut down. In some cases, the operating system 305 may save certain state information for use in resuming a session upon exiting low-power state. While in a low-power state, an IHS such as a laptop may be folded and stored for transport, or an IHS may remain unattended in a working posture.

As described with regard to FIG. 1, an IHS may include an embedded controller 120 that may be configured to receive inputs form user inputs devices supported by the IHS, such as the power button 210, the keys of the integrated keyboard 220 and the trackpad 215 of the laptop of FIG. 2A. During a low-power state of the IHS, at 345, such an embedded controller 310 may receive notification from a button driver 320 of the detection of a button of the IHS being pressed. As described, certain buttons may be configured to generate wake events from a low-power state upon being pressed. However, as described, some wake events generated in this manner may be false wake events that result from inadvertent activation of a button without the user's knowledge.

In order to begin determining whether the pressed button is a false wake event, at 350, the embedded controller 310 determines system status information regarding the IHS. For instance, in embodiments where the IHS is a laptop comprised two panels, such as a lid panel including a display screen and a base panel including an integrated keyboard, the embedded controller 310 may query a lid sensor 325 in order to determine whether the lid panel is currently in a closed or open position. In certain embodiments, lid sensor may detect the proximity between magnets located on opposite panel locations of a laptop or a convertible laptop. If the magnets are in close proximity to each other, the opposite panels of the laptop have been folded together such that the laptop is in a closed, or nearly closed, position. In certain embodiments, the lid sensor 325 may report whether the panels of a laptop are in a fully closed (i.e., latched) position and may also report whether the panels are effectively closed, even though not fully latched.

In addition to determining the lid position of a laptop IHS, at 350, the embedded controller 310 may also query an AC adapter 330 of the IHS in order to determine a power status of the IHS. In such embodiments, the AC adapter 330 may report whether the IHS is operating from battery power or whether the IHS is plugged in and operating from AC power. In embodiments where the IHS supports multiple types of charging inputs, such as wireless inductive charging and conventional charging via a power cord, AC adapter 330 may report the type of charging being conducted by the IHS. In addition, the AC adapter 330 may report the current charge level of the batteries of the IHS.

Upon collecting lid and power status information, at 335, the embedded controller 310 reports the detected wake event and the collected status information to a sensor hub 315. As described with regard to FIG. 1, an IHS may include a sensor hub 114 that receives inputs from various sensors and may be configured to combine such sensor inputs with its own sensor inputs in order to determine the current operating context of the IHS. Based on the operating context of the IHS, the sensor hub 315 determines whether a wake event is legitimate or is likely inadvertent due to the operating context indicating the IHS is not configured for use and/or no user is detected in proximity to the IHS.

In response to the wake event notification received from the embedded controller 310, at 360, the sensor hub 315 may query a mode sensor 335 that provides information regarding the posture in which the IHS is currently configured. In embodiments where the IHS is a laptop comprised of two panels, such as the laptop of FIG. 2A and the convertible laptop of FIGS. 2B-D, the mode sensor 335 may specify whether the angle of the hinge connecting the two panels indicates that the lid panel is sufficiently open such that a display is viewable. In scenarios where the lid is partially closed, the mode sensor 335 may specify that the lid is not fully closed, but the display is not viewable, thus indicating that the IHS is not currently in use. In embodiments where the IHS is a convertible laptop, such as in FIGS. 2B-D, the mode sensor 335 may specify the various postures supported by the convertible laptop based on the angle of the hinge that connects the two panels. For instance, the mode sensor 335 may report that the convertible laptop is configured as a laptop, a tablet, or in the tent configuration of FIG. 2D.

As described with regard to FIG. 1, in certain embodiments, a mode sensor 335 may also utilize orientation information captured by the internal movement sensors 340 in order to determine the mode in which a convertible laptop is currently configured. For instance, a hinge angle indicting a book mode configuration of an IHS may be confirmed based on the IHS being oriented on its side and may additionally be tilted towards a user. A hinge angle indicating the IHS is in a landscape mode may be confirmed based on the IHS being oriented with both panels facing upwards while the IHS is on a flat surface. Similarly, a hinge angle indicating a tent mode may be confirmed based on the IHS being oriented with the hinge propped upwards relative to the two panels.

In addition to determining the current posture in which the IHS is configured, the sensor hub 315 may also query the set of inertial movement sensors 340 in order to determine the current movement and orientation of the IHS. In some embodiments, the inertial movement sensors 340 may include accelerometer, gyroscope and magnetometer sensors that provide measurements allowing certain aspects of the current use of IHS to be inferred. For instance, the measurements provided by the inertial movement sensor 340 may indicate that the IHS is currently being transported and is unlikely to be in use. In some embodiments, the detected movement of the IHS may be characterized by the sensor hub 315 in order to determine whether the movements would allow the IHS to be used (e.g., such as limited movements that may result from the user holding the IHS in their hands as they walk), or whether the movements would prevent use of the IHS (e.g., such as due to jarring and irregular movements that may result from being carried within a bag). In some scenarios, measurements provided by the inertial movement sensor 340 may also indicate that the IHS is sitting still on a flat surface, thus indicating that IHS could be used in its current position. The measurements provided by the inertial movement sensor 340 may also indicate that the IHS is positioned on its side or upside down such that the IHS is unlikely to be currently in use.

As indicated in FIG. 3, the sensor hub 315 may utilize available sensors, at 365, to determine whether a user is detected in proximity to the IHS. As described, an IHS may include various sensors, such as camera, microphone and infrared sensors, that may be utilized to detect a user in proximity to the IHS. For instance, an infrared sensor may be used to determine whether a user is positioned at a location facing a display of the IHS. The camera sensor may be utilized to detect whether a user's face is present within close proximity to the IHS. In certain embodiments, the sensor hub 315 may combine output from such sensors in order to determine whether the user is located near the IHS and is positioned facing the IHS.

Based on the collected sensor information and the system status information reported by the embedded controller 310, at 370, the sensor hub 315 determines the validity of the reported wake event. For instance, sensor hub 315 may determine that an IHS is currently in transport based on a closed lid reported by the lid sensor 325, operation based on battery power reported by the AC adapter 330 and/or repeated sudden movements reported by the inertial measurement sensor 340. In such scenarios, multiple indications that the IHS is in transport and is unlikely to be in use may result in the sensor hub 315 determining that the wake event is a result of a button being inadvertently pressed. Similarly, sensor hub 315 may determine that a wake event signal is legitimate based upon the detection of a user in close proximity to the IHS, the mode sensor 335 indicating the IHS is in a tablet configuration and/or the inertial movement sensor 340 indicates the IHS is lying on a flat surface. In some scenarios, sensor hub may determine that a detected wake event is legitimate regardless of the reported orientation or movement of the IHS, as long as a user is identified in proximity to the IHS and the IHS is in a usable posture. In another scenario, the sensor hub may determine that a wake event is legitimate even if no user is detected in proximity to the IHS, but the AC adapter sensor 330 reports that IHS is plugged into an AC power source and the lid sensor 325 reports that the lid is not closed. In this manner, the sensor hub 315 may be configured to generate determinations regarding the validity of a wake event, where the determinations may be made based on the current operational context of the IHS.

As illustrated, at 375, upon determining the validity of the wake event, the sensor hub 315 reports the validity determination to the embedded controller 310. If the wake event is determined to be a false wake event, the embedded controller 310 may refrain from reporting the wake event such that the IHS remains in a low-power state. However, if the wake event is determined to be legitimate, the embedded controller 310 may notify the operating system 305 of the detected wake event. In response to such notification, the operating system 305 may restore any saved state and power may be restored to components that have been shut down or placed in a low-power mode. Once the operating system 305 is restored, use of the IHS may resume.

Figure 4:
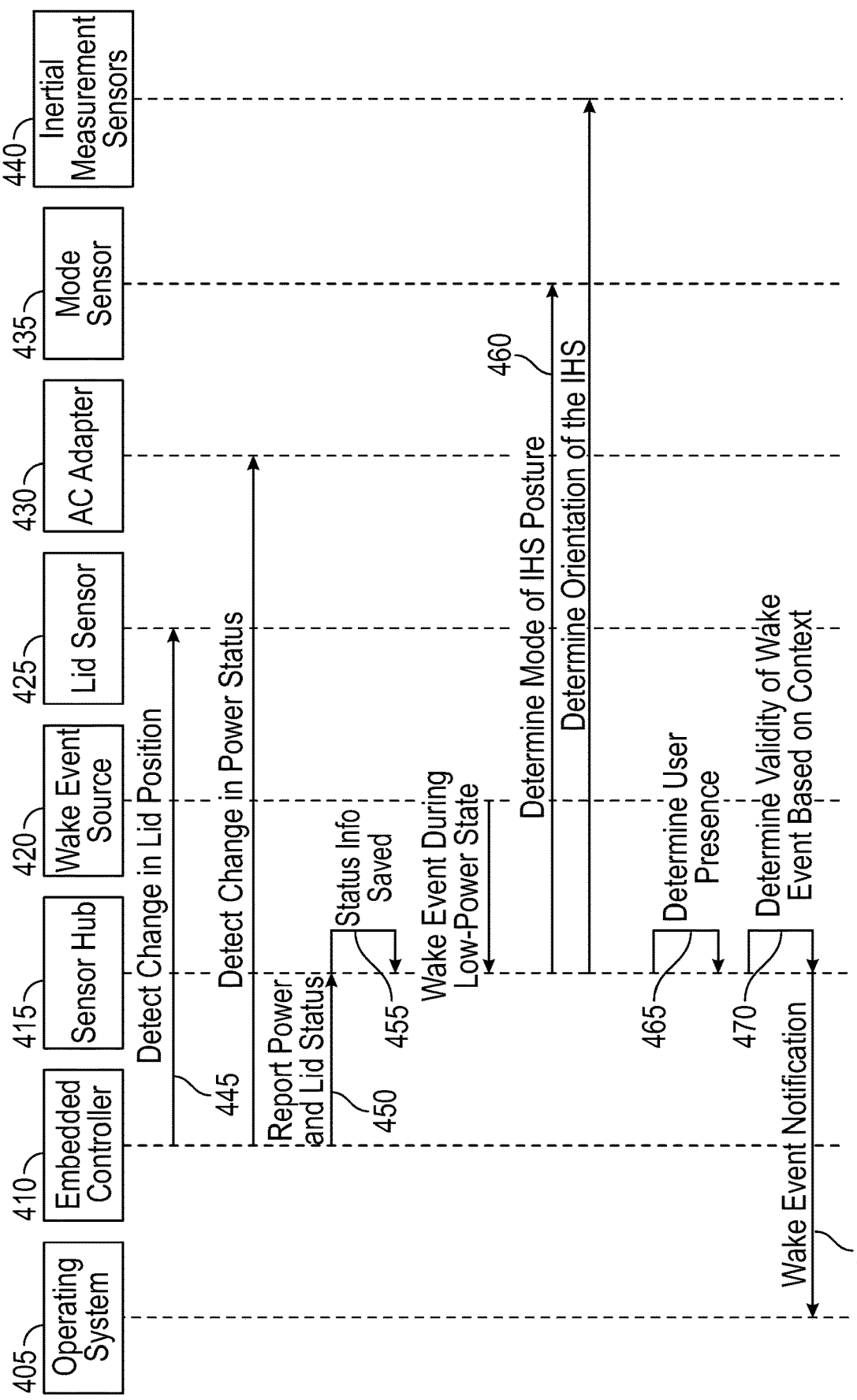
FIG. 4 is a swim lane diagram illustrating certain responsibilities of components of an IHS configured according to certain additional embodiments for preventing false wake events of the IHS from a low-power state.

FIG. 4 is a swim lane diagram illustrating certain responsibilities of components of an IHS configured according to certain additional embodiments for preventing false wake events of the IHS from a low-power state. In the embodiment of FIG. 3, the wake event signals, such as a button being pressed, are detected by the embedded controller. However, various additional wake signals may be utilized. In the embodiment of FIG. 4, wake event signals may be received, at 460, from various wake event sources 420 by the sensor hub 415. One such wake event signal that may be received by the sensor hub 415 is the detection of a user facing the display screen of the IHS. Such a detection may indicate a user is ready to begin use of the IHS. However, the validity of such wake signals may be ensured in order to prevent inadvertently exiting from a low-power state without the user's knowledge.

As in the embodiment of FIG. 3, the embedded controller 410 of FIG. 4 may query a lid sensor 425 in order to determine the position of the lid of a laptop IHS and may query an AC adapter 430 in order to determine the power status of an IHS. In certain embodiments, the embedded controller 410 may be configured to detect any changes to the position of the lid or to the power status of the IHS. Upon detecting any such changes, at 450, the embedded controller 410 may report the current power and/or lid status to the sensor hub 415. At 455, the reported lid and power status information may be stored by sensor hub 415 for use in evaluating the operating context in which the next wake event is received by the sensor hub.

As described, at 460, the sensor hub 415 may receive a wake event from a wake event source 420, such as detecting a user's presence in proximity to the IHS. The sensor hub 415 may be configured to receive wake events from various other sources. For instance, sensor hub 415 may receive indications of user activity from an external keyboard or external mouse that is coupled to the IHS. In certain embodiments, the sensor hub 415 may receive wake events in response to detecting certain buttons being pressed, such as the power buttons provided by the laptops in FIGS. 2A-D. As in the embodiment of FIG. 3, in response to the wake event, at 465, the sensor hub 415 may query a mode sensor 435 in order to determine the current posture of the IHS, such as based on the hinge angle connecting the two panels of a laptop and based on the orientation of the laptop. Additionally, at 465, the sensor hub 415 may query an inertial measurement sensor 440 in order to determine the orientation of the IHS and any movement of the IHS, thus providing an indication of whether the IHS is in transport. As described, at 470, the sensor hub 415 may additionally determine whether a user is in proximity to the IHS.

As in the embodiment of FIG. 3, the sensor hub 415 evaluates the contextual information describing the current use of the IHS as reported by the status information received from the embedded controller 410 and the sensor information collected by the sensor hub 415. Based on the context of the IHS at the time of the wake event, the sensor hub 415 determines whether the wake event is legitimate. If the context of the IHS indicates that the IHS is not configured for use and/or a user is not detected, the wake event may be dismissed by the sensor hub 415 as being inadvertent. However, if the sensor hub 415 determines that the context information indicates the IHS is ready for use and/or a user is present, at 475, the sensor hub 415 notifies the operating system 405 of the wake event and the IHS exits the low-power state.

Figure 5:
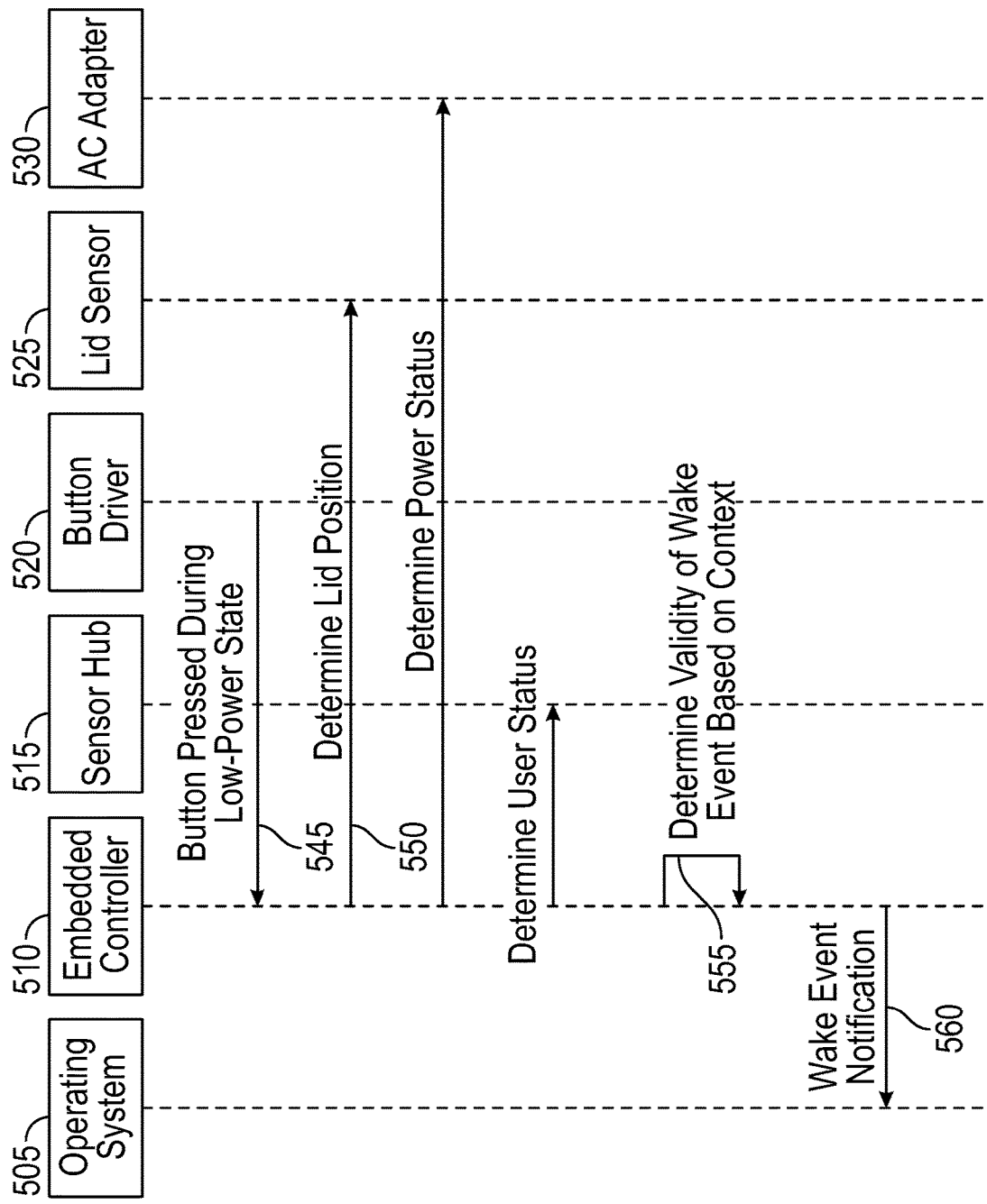
FIG. 5 is a swim lane diagram illustrating certain responsibilities of components of an IHS configured according to certain additional embodiments for preventing false wake events of the IHS from a low-power state.

FIG. 5 is a swim lane diagram illustrating certain responsibilities of components of an IHS configured according to certain additional embodiments for preventing false wake events of the IHS from a low-power state. In the embodiment of FIG. 5, the embedded controller 510 is utilized for determining the validity of wake event signals. The embodiment of FIG. 5 may still utilize a sensor hub 515. Unlike the sensor hubs of FIGS. 3 and 4, the sensor hub 515 does not include capabilities such as determining a posture of an IHS based on a hinge angle or determining any movement or orientation of the IHS. However, the sensor hub 515 may include limited capabilities for determining the status of a user, such as based on the use of a camera of the IHS.

As with the embodiment of FIG. 3, wake event signals in the form of buttons being pressed result in notifications, at 545, by a button driver 520 two the embedded controller 510. The embedded controller 510 then determines, at 550, a lid position from a lid sensor 525 and a power status from an AC adapter 530. Additionally, the embedded controller 510 may query the sensor hub 515 for any available user status information. At 555, the embedded controller 510 determines the validity of the wake event based on the operational context of the IHS in the same manner as the sensor hub in the embodiments of FIGS. 3 and 4. For instance, the embedded controller 510 may determine that based on an IHS operating on battery power and the lid of the IHS being closed, the IHS is unlikely to be in use and a received wake event may be disregarded. If the wake event is determined to be legitimate, at 560, the embedded controller 510 notifies the operating system 505 and the IHS may resume full-power operations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for determining the validity of a wake event detected in an Information Handling System (IHS) operating in a low-power state, the method comprising:
    detecting the wake event;
    determining a power status of the IHS by determining whether the IHS is operating from an internal battery or whether the IHS is coupled to an external power source at the time of the wake event detection;
    determining a user status of the IHS at the time of the wake event detection, wherein the user status comprises a proximity of a user to the IHS;
    subsequent to detecting the wake event, determining an operational status of the IHS;
    subsequent to detecting the wake event, determining a physical orientation of the IHS;
    subsequent to detecting the wake event, determining a validity of the detected wake event based at least in part on the power status, the operational status, and the user status, wherein, when the user is determined to not be in proximity to the IHS, the validity of the detected wake event is further determined based at least in part on the physical orientation of the IHS, and wherein invalidity of the detected wake event is indicated when the IHS is determined as operating from the internal battery and validity of the detected wake event is indicated when the IHS is determined as coupled to an external power source;
    suppressing an invalid wake event; and
    notifying an operating system of the IHS of a valid wake event.

2. The method of claim 1, wherein an embedded controller of the IHS determines whether the IHS is operating from the internal battery or is coupled to the external power source.

3. The method of claim 1, further comprising:
    determining movement of the IHS at the time of the wake event detection, wherein the validity of the wake event is further determined based at least in part on whether the movement prevents use of the IHS.

4. The method of claim 3, wherein the wake event is determined to be invalid due to use of the IHS being prevented if the movement of the IHS includes jarring movements.

5. The method of claim 1, wherein the IHS is a laptop and wherein the operational status indicates whether the laptop is in a closed configuration, as determined based on a lid position sensor of the IHS.

6. The method of claim 1, wherein the user status indicates whether a user is detected in proximity to the IHS at the time of the wake event detection, and whether the user is facing a display of the IHS.

7. The method of claim 1, further comprising:
    determining a physical configuration mode of the IHS at the time of the wake event detection, wherein the IHS is a convertible laptop, and wherein the physical configuration mode indicates a posture of the convertible laptop based in part on a hinge angle of the convertible laptop, and further based on an orientation of the hinge of the convertible laptop.

8. An Information Handling System (IHS) configured to determine the validity of a wake event detected while operating in a low-power state, the IHS comprising:

a plurality of hardware components configured to operate at reduced power while the IHS is in the low-power state, wherein the plurality of hardware components comprises a main processor system of the IHS;
a sensor hub comprising a logic unit configured via firmware instructions to determine a user status of the IHS; and
an embedded controller comprising a logic unit configured via firmware instructions to:
detect the wake event;
receive the user status of the IHS from the sensor hub, wherein the user status comprises a proximity of a user to the IHS;
determine a power status of the IHS, wherein the power status comprises whether the IHS is operating from an internal battery or whether the IHS is coupled to an external power source;
subsequent to detecting the wake event, determine an operational status of the IHS;
subsequent to detecting the wake event, determine a physical orientation of the IHS;
subsequent to detecting the wake event, determine a validity of the detected wake event based at least in part on the power status, the operational status, and the user status, wherein, when the user is determined to not be in proximity to the IHS, the validity of the detected wake event is further determined based at least in part on the physical orientation of the IHS, and wherein invalidity of the detected wake event is indicated when the IHS is determined as operating from the internal battery and validity of the detected wake event is indicated when the IHS is determined as coupled to an external power source;
suppress an invalid wake event; and
notify an operating system of the IHS of a valid wake event.

9. The IHS of claim 8, wherein the embedded controller is further configured to determine movement of the IHS at the time of the wake event detection, wherein the validity of the wake event is further determined based at least in part on whether the movement prevents use of the IHS.

10. The IHS of claim 8, wherein the IHS is a laptop and wherein the operational status indicates whether the laptop is in a closed configuration, as determined based on a lid position sensor of the IHS.

11. The IHS of claim 9, wherein the wake event is determined to be invalid due to use of the IHS being prevented if the movement of the IHS includes jarring movements.

12. An Information Handling System (IHS) configured to determine the validity of a wake event while operating in a low-power state, the IHS comprising:
a plurality of hardware components configured to operate at reduced power while the IHS is in the low-power state, wherein the plurality of hardware components comprises a main processor system of the IHS;
an embedded controller comprising a logic unit configured via firmware instructions to:
detect the wake event;
determine a power status of the IHS, wherein the power status comprises whether the IHS is operating from an internal battery or whether the IHS is coupled to an external power source;
subsequent to detecting the wake event, determine an operational status of the IHS;
notify a sensor hub of the detected wake event and the operational status;
suppress an invalid wake event; and
notify an operating system of the IHS of a valid wake event; and
the sensor hub comprising a logic unit configured via firmware instructions to:
determine a user status of the IHS, wherein the user status comprises a proximity of a user to the IHS;
subsequent to detecting the wake event, determine a physical orientation of the IHS;
subsequent to the detection of the wake event, determine a validity of the detected wake event based at least in part on the power status, the operational status, and the user status, wherein, when the user is determined to not be in proximity to the IHS, the validity of the detected wake event is further determined based at least in part on the physical orientation of the IHS, and wherein invalidity of the detected wake event is indicated when the IHS is determined as operating from the internal battery and validity of the detected wake event is indicated when the IHS is determined as coupled to an external power source; and
notify the embedded controller of the determined validity of the detected wake event.

13. The IHS of claim 12, wherein the IHS is a laptop and wherein the operational status is determined based on whether a hinge angle of the laptop indicates that a lid panel of the laptop is not sufficiently open for a display panel of the laptop to be viewable.

14. The IHS of claim 12, wherein the IHS is a laptop and wherein the operational status indicates whether the laptop is in a closed configuration, as determined based on a lid position sensor of the IHS.

15. The IHS of claim 12, wherein the sensor hub is further configured to determine movement of the IHS at the time of the wake event detection, wherein the validity of the wake event is determined further based on whether the movement prevents use of the IHS.

16. The IHS of claim 15, wherein the wake event is determined to be invalid due to use of the IHS being prevented if the movement of the IHS includes jarring movements.

17. The IHS of claim 12, wherein the user status indicates whether the user is detected in proximity to the IHS at the time of the wake event detection, and whether the user is facing a display of the IHS.

\* \* \* \* \*